United States Patent [19]

Schlapman et al.

[11] Patent Number: 4,582,504
[45] Date of Patent: Apr. 15, 1986

[54] TRAILING MOWER, BELT, CLUTCH AND BRAKE ASSEMBLY

[75] Inventors: William J. Schlapman, Winneconne; James L. Wirsbinski, Oshkosh; Dale Manteufel, Hortonville, all of Wis.

[73] Assignee: Ingersoll Equipment Co., Inc., Winneconne, Wis.

[21] Appl. No.: 701,257

[22] Filed: Feb. 13, 1985

[51] Int. Cl.[4] .............................................. F16H 7/22
[52] U.S. Cl. ..................................... 474/119; 474/125; 474/133
[58] Field of Search ........................ 474/119, 125, 133

[56] References Cited

U.S. PATENT DOCUMENTS

| | | | |
|---|---|---|---|
| 2,488,765 | 11/1949 | Couse | 474/119 X |
| 2,603,979 | 7/1952 | Pont | 474/119 X |
| 2,696,741 | 12/1954 | Wilkin | 474/119 |

Primary Examiner—James A. Leppink
Assistant Examiner—Frank McKenzie
Attorney, Agent, or Firm—Cullen, Sloman, Cantor, Grauer, Scott & Rutherford

[57] ABSTRACT

A clutching mechanism for a suspended belt driven mower assembly that automatically removes the mower drive belt from the pulley system when the mower assembly is raised. A brake contacts the endless drive belt when the mower is in the raised position to prevent movement of the belt. A belt retainer is positioned about one of the pulleys of the pulley system to retain the belt adjacent the pulleys when the belt tension is released. An electrical interlock system is provided to prevent the motor from being started in any position other than the mower assembly raised position.

13 Claims, 3 Drawing Figures

TRAILING MOWER, BELT, CLUTCH AND BRAKE ASSEMBLY

BACKGROUND OF THE INVENTION

The present invention relates to a pulley system for use in a belt driven mower assembly having an endless drive belt. More particularly, this invention relates to a clutching sheave that automatically releases the driving belt from driving engagement with the pulley system when the mower assembly is raised to a non-use position and automatically re-engages the belt when the mower assembly is lowered to the use position.

Belt driven mower units having a suspended mower assembly that can be raised and lowered to use and non-use positions are common. Typically, the assembly is hydraulically attached to the unit through parallel links and can be raised and lowered from the tractor seat. However, the operator must remember to disengage the mower blade when the mower assembly is raised because, in general, there is no way to automatically stop the mower blades from spinning. Also, starting the motor with the pulley assembly and blades engaged is more difficult due to the starter being operatively connected to the pulley system and having to turn not only the motor but the entire pulley system. This makes starting of the motor difficult, if not impossible, and reduces battery, starter, and belt life.

The present invention overcomes the above disadvantages by providing a clutch mechanism that is simply constructed and automatically disengages the belt from the pulley system as the mower assembly is raised. There is also provided a braking means that prevents the belt from turning in the raised position, a belt guard that prevents the belt from entirely separating from the pulley system and an in interlock system that only permits the motor to be started in the raised position with the belt disengaged. Further, a belt tension adjusting means is provided to insure proper belt tension.

SUMMARY OF THE INVENTION

As explained above, the clutching mechanism of this invention is for use on a belt driven mower assembly having a flexible endless belt that operatively interconnects a power source and a cutting blade. The mower assembly is attached to a lifting mechanism for raising and lowering it to a use and a non-use position.

The clutching mechanism has a first support arm having first and second ends, the first end rotatably supports a clutch sheave about which the belt is rotatably received and the second end is pivotally attached to a fixed support member. The clutch sheave is pivotable in a arcuate path about the fixed support to a first position, wherein the belt drivingly engages the sheave and pulley system, and a second position, wherein the belt is released from frictional engagement with the sheave and pulley system.

A biasing means is affixed to the upper end of the support arm adjacent the sheave to bias the sheave into the first position. A control means is connected to the lifting mechanism and the support arm for pulling the clutch sheave to the second position against the bias of the biasing means when the mower assembly is raised to the non-use position wherein the blade is automatically not driven.

As disclosed, the lifting mechanism includes a hydraulic cylinder connected to a bellcrank having a cross shaft which has two opposed parallel lifting arms extending radially outwardly therefrom. The free ends of the lifting arms are connected to link means which are fixedly attached to the mower assembly. A clutch link is also attached to the bellcrank cross shaft and extends radially outwardly from the cross shaft and has the control means attached to its free end. Thus, by actuating the hydraulic cylinder, the bellcrank is rotated which simultaneously raises the mower assembly and pivots the clutch pulley to the second position wherein the belt is released from frictional engagement with the pulley system.

In the disclosed embodiment, the control means includes a flexible cable attached at one end to the clutch link having a turnbuckle type connector at the opposite end which is attached to the support arm.

The clutching mechanism further has a second support arm having a mule sheave attached at one end with the opposite end pivotally attached to the fixed support member. The mule sheave has an adjustment means adapted to incrementally adjust the mule sheave which adjusts the tension of the belt.

The adjustment means includes a third arm which is attached at one end to the support member parallel to and spaced from the second support arm. An adjustment nut is pivotally attached to the second arm and the third arm for receipt of the threaded member such that the mule sheave is incrementally adjusted about the fixed support to adjust the tension of the belt.

A retaining means is radially positioned about one of the pulleys of the pulley system to retain the belt adjacent the pulleys when the clutch sheave is in the second position.

An ignition interlock system prevents the motor from being started in any position other than the second position.

The present invention further has a belt braking means having a first curved pad supported above a section of the belt and a second curved pad supported on the mower assembly a space distance directly below the belt. When the assembly is raised to the second position, the second pad converges toward the first pad trapping the belt therebetween and preventing any further belt movement.

DESCRIPTION OF THE PREFERRED EMBODIMENTS

Figure 1:
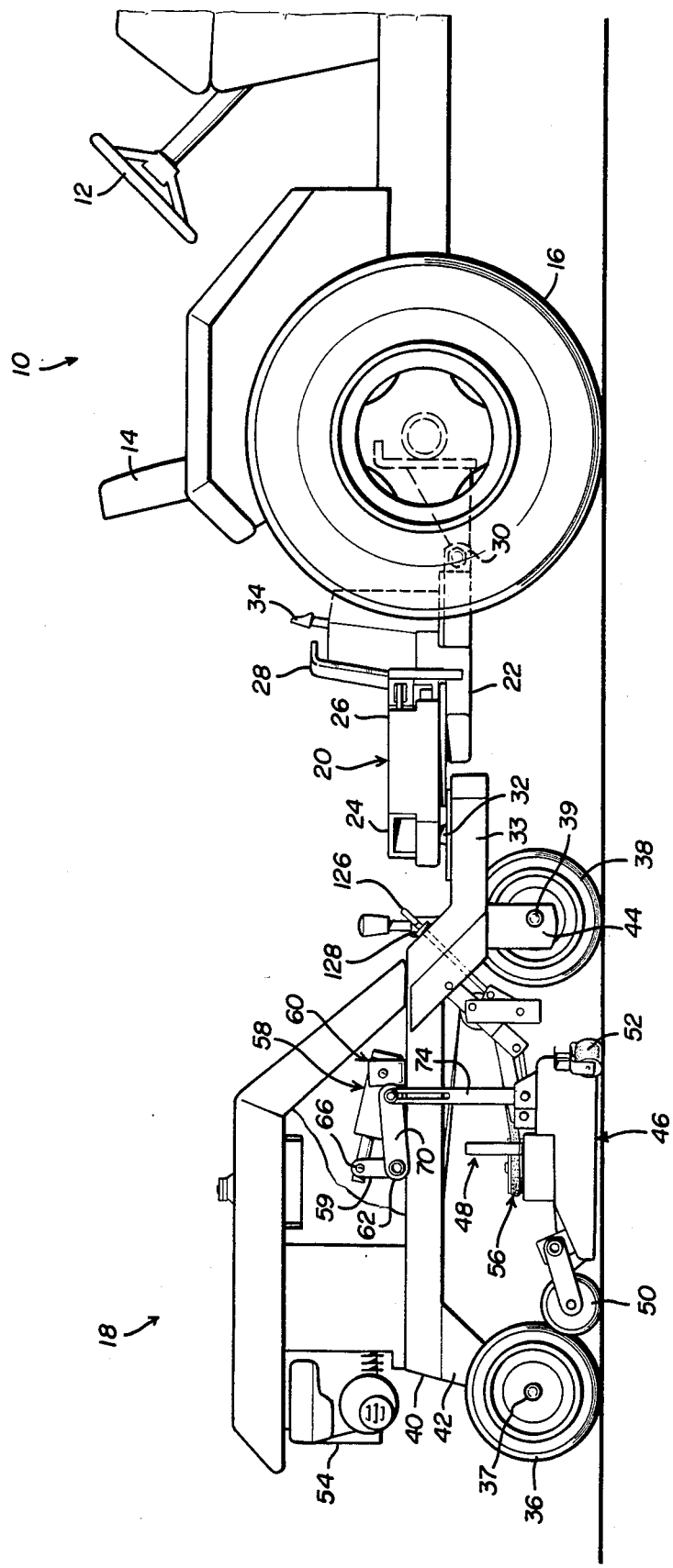
FIG. 1 is a side elevation of the lifting mechanism and mower assembly in use on a towed mower unit.
Figure 2:
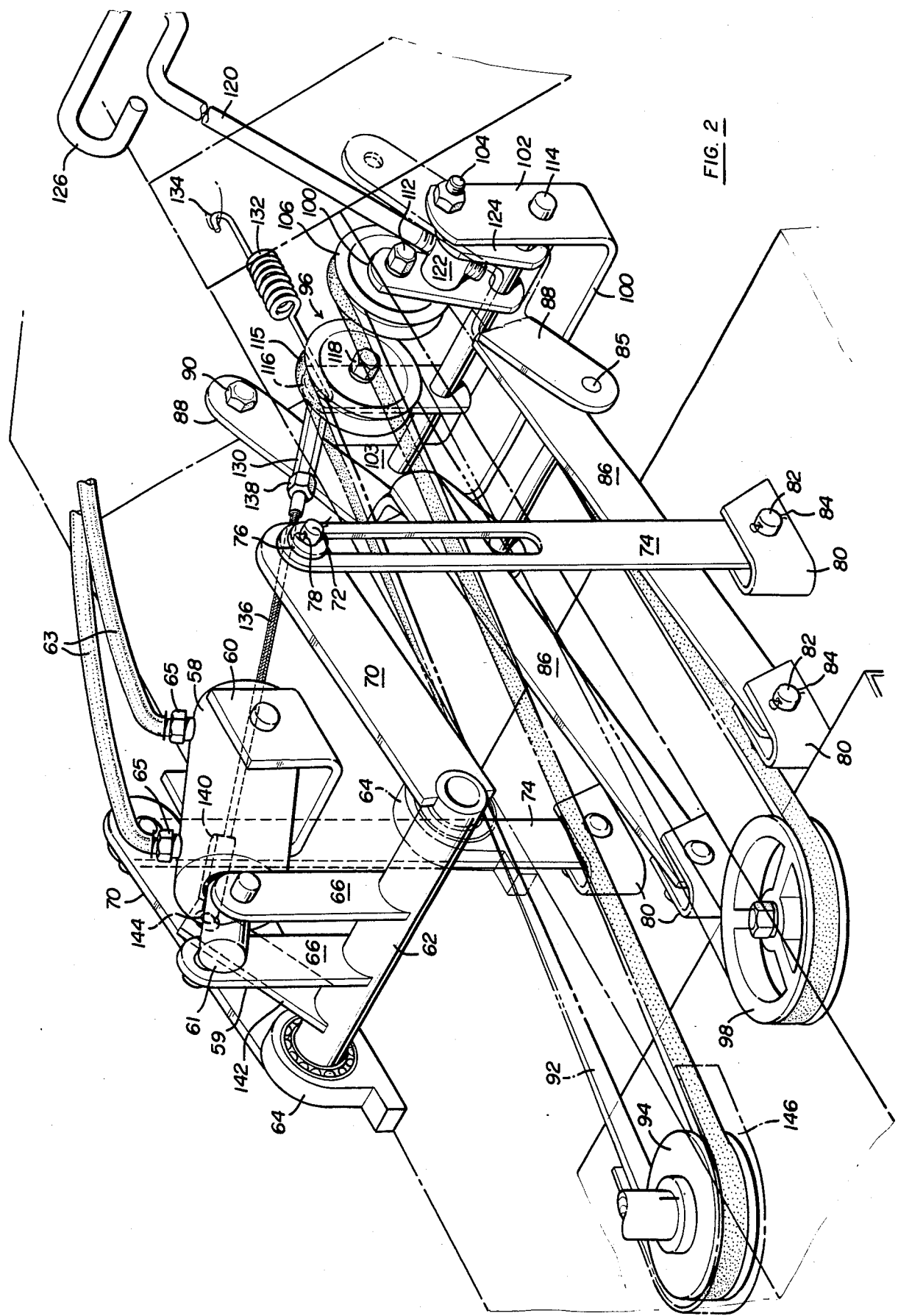
FIG. 2 is an elevated perspective view of the clutch mechanism, pulley system, and lifting mechanism.

In the disclosed embodiment, a riding mower 10 is illustrated having steering assembly 12, driver seat 14 and rear wheel 16 towing an independent mower unit 18 by an articulate tow bar 20. The articulate tow bar 20 has a first boom member 22 and a second boom member 24 which are connected at adjacent ends by a lockable coupling means 26 that can be controlled from the driver seat by an articulation control lever 28. The opposite end of first boom member 22 is connected to tractor 10 by a lateral hitch 30. The opposite end of second boom member 24 is connected to the mower unit 18 by a universal joint 32 supported upon hitch 33.

The operator can control independent mower unit 18 from his driver seat by use of control means 34 positioned on boom member 22 adjacent tractor 10.

Independent mower unit 18 is supported upon rear wheels 36 attached to chassis 40 by support brackets 42 and axles 37 and a single front caster wheel 38 attached to chassis 40 by bracket 44 and axle 39.

A mower assembly 46 is suspended between front and rear wheels 36 and 38 by a linkage system 48. Gauge wheels 50 support the rear of mower assembly 46 and adjust its height for uneven terrain and caster wheels 52 support its front end. A motor means 54 provides the power for mower assembly 46 through a pulley and belt system shown generally at 56.

Fluid cylinder 58, as for example a hydraulic cylinder, provides the power for raising and lowering assembly 46. Cylinder 58 is supported within a U-shaped bracket 60 affixed to chassis 40 and has an actuator shaft 61 connected through links 59 to a bellcrank cross shaft 62 which is rotatably journaled within ball bearing pillow blocks 64 or any conventional bearing such as a leather bearing.

Affixed at the outer ends of the bellcrank 62 are parallel opposed lifting and support arms 70 which have pins 72 at their outer ends. Connected to the support pins 72 are parallel opposed vertical lift links 74. Vertical links 74 are lost motion links to permit free vertical movement of assembly 46. Washer 76 and cotter key 78 retain lift links 74 on pins 72. The opposite end of lift link 74 is fixedly attached to mower assembly 46 by a U-shaped bracket 80, pin 82 and cotter key 84. A second pair of mower assembly support brackets 86 are fastened at one end in U-shaped brackets 80 by pins 82 and cotter key 84 and fastened at their opposite end to a Z-shaped support bracket 88 which is affixed to the chassis 40 by bolt means 90. The mower assembly 46 is further supported by brackets (not shown) that are pivotally mounted to cross shaft 85 and mower assembly 46. By actuating hydraulic cylinder 58, bellcrank 62 is rotated which raises mower assembly 46.

An endless drive belt 92 is received by a power take-off pulley 94, idler sheave assembly 96 and mower driven pulley 98 transmitting the power from motor means 54 to mower assembly 46.

The idler sheave assembly 96 is supported within a U-shaped bracket 100 having upwardly extending legs 102 and 103 fixedly attached to the Z-shaped support bracket 88 by bolts 104. Idler sheave assembly 96 has a fixed mule sheave 106 and a clutch sheave 115. Mule sheave 106 is rotatably supported at the upper end of a support arm 110 by a bolt and bearing assembly 112. The lower end of support arm 110 is pivotally attached to a fixed cross shaft 114 that is supported in apertures formed in legs 103 and 102. The pivotal connection of arm 110 to cross shaft 114 is by an aperture formed in the bottom of arm 110 which allows it to freely pivot about cross shaft 114. Clutch sheave 115 is rotatably supported on support arm 116 by a bolt and bearing assembly 118. Support arm 116 is pivotally attached to cross shaft 114 in the same manner as arm 110.

Drive belt tension is adjusted by incrementally rotating mule sheave 106 about cross shaft 114. Incremental rotation is achieved by an adjustment screw 120, which is threadably received in a barrel nut 122 attached to support arm 110. The barrel nut is rotatably retained between support arm 110 and a support link 124 that is pivotally attached to cross shaft 114 in the same manner as arm 110. The adjustment screw 120 includes a handle portion 126 which extends beyond the hitch 33 as shown in FIG. 1, and a roll pin assembly 128 which prevents longitudinal movement of the adjustment screw, while permitting rotational movement.

Rotational movement of the adjustment screw 120 threads screw 120 into the barrel nut 122 and adjusts the angular position of support arm 110 toward hitch 33 increasing tension in belt 92. Rearward movement of arm 110 and link 124 by unthreading screw 120 from barrel nut 122 relieves the tension in drive belt 92. Belt tension may thus be easily adjusted by rotation of adjustment screw 120.

Clutch sheave 115 is operatively attached through support arm 116 to a tension idler cable 136 and a coil spring 132 which is hooked to the chassis at 134. Cable 136 is connected by a jam nut 138 to a turnbuckle type tie arm 130 which is affixed to the top portion of arm 116. Tie arm 130 allows the tension in cable 136 to be adjusted. A clevis 140 is affixed to the opposite end of cable 136 and attached to the free end of a clutch arm 142 by a pin 144. Clutch arm 142 is fixedly attached to bellcrank cross shaft 62 and extends radially outwardly therefrom. When hydraulic cylinder 58 is actuated to raise mower assembly 46, arm 142 is rotated clockwise which pivots clutch sheave 115 clockwise away from hitch 33 and releases the frictional engagement of endless belt 92 from the pulley system. In the disclosed embodiment, idler cable 136 is flexible and compensates for any difference in the arcuate paths 142 and support arm 116. Thus, This allows power take-off pulley 94 is freely rotatable without frictional engagement with the endless belt 92 and the mower blades (not shown) are not rotating. Also, with mower assembly 46 raised, the motor 54 may be started without turning the pulley system making starting easier.

When the mower assembly 46 is lowered, actuator 61 is retracted releasing the tension on cable 136, permitting spring 132 to pull clutch sheave 115 back to its original position in frictional engagement with belt 92.

A belt shield 146 is positioned about drive pulley 94 to prevent belt 92 from separating from the pulley groove when belt tension is released by keeping belt 92 adjacent to the pulley groove.

Figure 3:
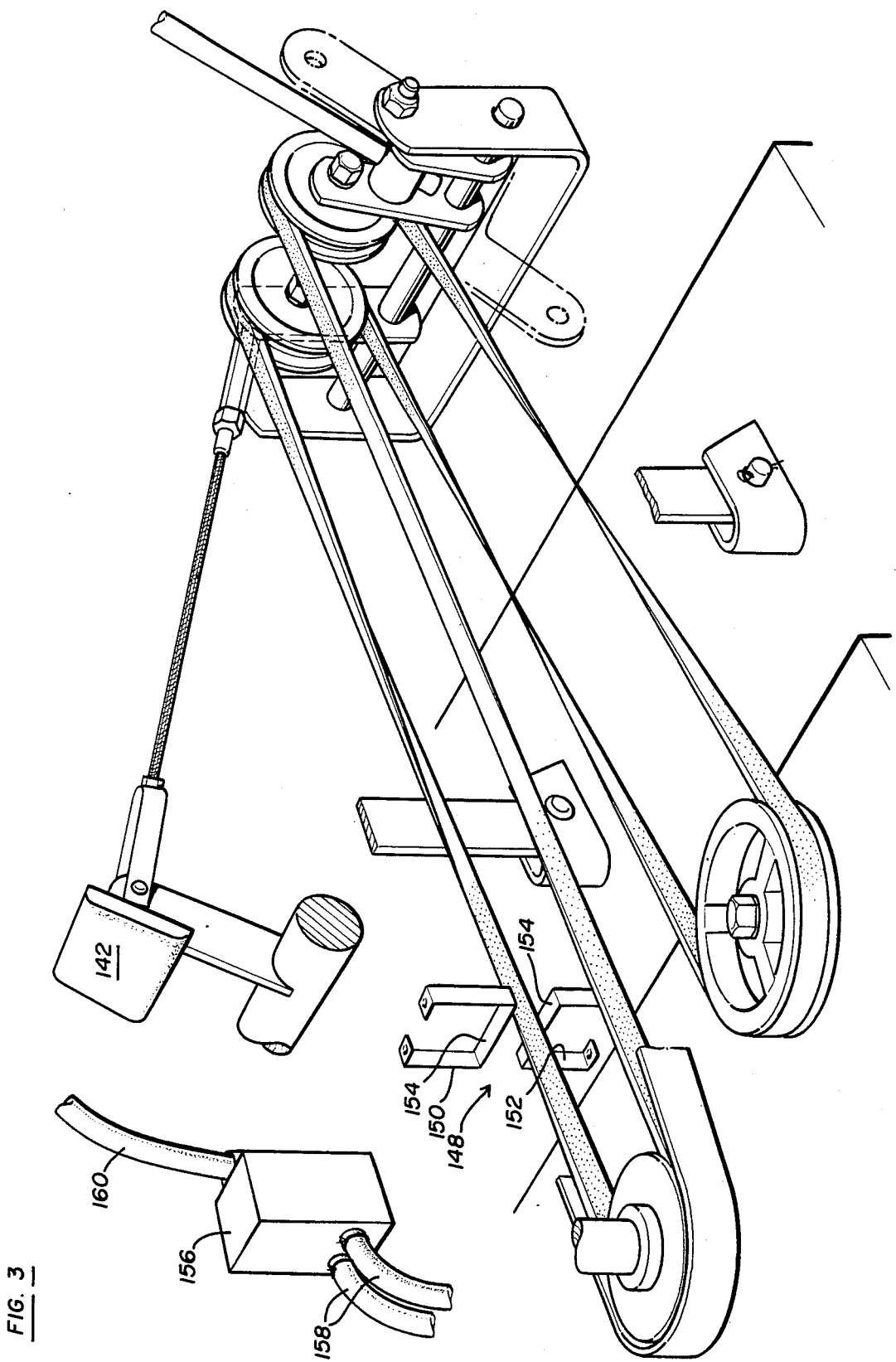
FIG. 3 is a partial elevated perspective view of the interlock system and braking means in use on the pulley system.

As the mower assembly 46 is raised, the belt is stopped from further movement by belt brake means 148, see FIG. 3. Brake 148 has an upper U-shaped bracket 150 positioned above belt 92 and affixed to chassis 40 and a lower U-shaped bracket positioned below belt 92 and affixed to mower assembly 46. Each bracket 150 and 152 has a semi-cylindrical brake pad surface 154 for contacting belt 92 when mower assembly 46 is in the raised position.

To prevent the mower from being starting in the lowered position and having to rotate the pulleys and sheaves, microswitch 156 is used. Switch 156 has electrical leads 158 connecting it to the electrical system of the starter and an electrical contact 160 which breaks the electrical circuit to the starter when arm 142 is not in contact with it. When arm 142 contacts contact 160, the electrical circuit to the starter is closed and the engine can be started; this only occurs in the raised position.

Thus, it is apparent that there has been provided in accordance with the invention a clutching mechanism that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A clutching mechanism for a belt driven mower assembly having a flexible endless belt received about a plurality of pulleys and sheaves operatively interconnecting a power source and a rotatable cutting blade shaft, said mower assembly being attached to a lifting mechanism for raising and lowering said mower to an operative use or non-use position, said clutching mechanism comprising:

- a first support arm having first and second ends, said first end rotatably supporting a clutch sheave about which said belt is rotatably received, said second support arm end being pivotally connected to a fixed support member;
- said clutch sheave being pivotable in an arcuate path about said fixed support member and said clutch sheave having a first position wherein said belt frictionally engages said plurality of pulleys and sheaves and a second position wherein said belt is released from frictional engagement with said plurality of pulleys and sheaves;
- biasing means fixedly attached to said arm normally biasing said sheave to said first position; and
- control means interconnecting said lifting mechanism and said arm moving said clutch sheave in said arcuate path to said second position when said mower assembly is raised to said non-use position by said lifting mechanism.

2. The clutching mechanism of claim 1, wherein said lifting mechanism comprises a power means connected to a bellcrank assembly,

- said bellcrank assembly having a cross shaft and at least one lifting arm affixed to said cross shaft and extending radially outwardly therefrom,
- said lifting arm being affixed at its free end to at least one link fixedly attached to said mower assembly for raising and lowering said mower assembly; and
- a clutch link extending radially outwardly from said bellcrank cross shaft, said clutch link having said control means attached thereto; whereby actuating said power means rotates said bellcrank cross shaft which simultaneously raises said mower assembly and pivots said clutch pulley to said second position, wherein said belt is released from frictional engagement with said pulleys.

3. The clutching mechanism of claim 1, wherein said control means includes a flexible cable having first and second ends, said first end attached to said clutch link, said second end having an adjustable connector attached to said arm; whereby pivotal movement of said clutch link is translated to said arm.

4. The clutching mechanism of claim 1, further comprising a second support arm having first and second ends, said first end rotatably supporting a mule sheave about which said belt is received, said second end being pivotally connected to said fixed support member adjacent said first support arm;

- said mule sheave having an adjustment means adapted to incrementally adjust said mule sheave for adjusting the tension of said belt received by said plurality of pulleys and sheaves.

5. The clutching mechanism of claim 4, wherein said adjustment means includes:

- a third support arm having first and second ends, said second end being pivotally connected to said fixed support member parallel to said second arm, said first end and said second arm;
- a threaded member received in said nut such that said mule sheave is incrementally adjustable about said fixed support to adjust the tension of said belt received about said sheave.

6. The clutching mechanism of claim 1 further comprising a retaining means radially positioned about one of said plurality of pulleys to retain said belt adjacent said pulleys in said second position.

7. The clutching mechanism of claim 1, further comprising a belt braking means having a first pad supported above a section of said belt and a second pad supported on said mower assembly a spaced distance below said first pad,

- said second pad converging toward said first pad when said assembly is raised to said second position, whereby said belt is held between said pads and prevented from further movement.

8. The clutch mechanism of claim 1, further comprising an ignition interlock means,

- said interlock means preventing starting of said power source in any position other than said second position.

9. A clutching mechanism for a belt driven mower assembly having a flexible endless belt received about a plurality of pulleys and sheaves operatively interconnecting a power source and a rotatable cutting blade shaft, said mower assembly being attached to a lifting mechanism for raising and lowering said mower assembly to an operative use or non-use position, said clutching mechanism comprising:

- a rotatable cross shaft connected by link means to said lifting mechanism, said cross shaft having two parallel spaced lifting arms extending radially outwardly therefrom,
- each of said lifting arms being affixed at its free end to a link fixedly attached to said mower assembly for raising and lowering said mower assembly,
- a clutch link affixed to said cross shaft extending radially outwardly therefrom,
- a support arm having first and second ends, said first end rotatably supporting a clutch sheave about which said belt is rotatably received, said second support arm end being pivotally connected to a fixed support member;
- said support arm being pivotable in an arcuate path about said fixed support member, said support arm having a first position wherein said belt frictionally engages said clutch sheave and a second position wherein said belt is released from frictional engagement with said clutch sheave;
- control means having first and second ends, said first end being attached to said clutch link at its free end, said second end of said control means being attached to said first end of said support arm, said control means moving said support arm in said arcuate path to said second position when said mower assembly is raised to said non-use position by said lifting mechanism,
- and biasing means fixedly attached to said first end of said support arm normally biasing said sheave to said first position.

10. The clutching mechanism of claim 9, wherein said lifting mechanism comprises a fluid cylinder having an actuable piston arm, whereby actuation of said piston arm rotates said cross shaft.

11. The clutching mechanism of claim 9, wherein said control means comprises a flexible cable having an adjustable connector attached thereon.

12. The clutching means of claim 9 further comprising a retaining means radially positioned about one of said plurality of pulleys to retain said belt adjacent said pulleys in said second position.

13. The clutching mechanism of claim 9, further comprising a belt braking means having a first pad supported above a second of said belt and a second pad supported on said mower assembly a spaced distance below said first pad, said second pad converging toward said first pad when said assembly is raised to said second position, whereby said belt is held between said pads and prevented from further movement.

* * * * *